Feb. 27, 1945.  M. B. WOOD  2,370,340
CIRCUIT BREAKER
Filed July 7, 1942
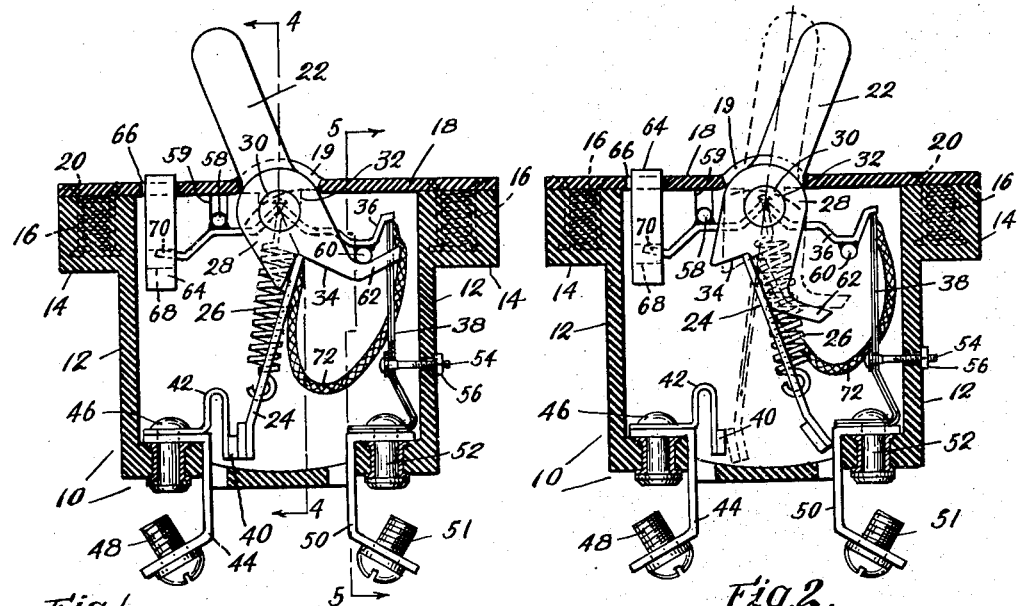
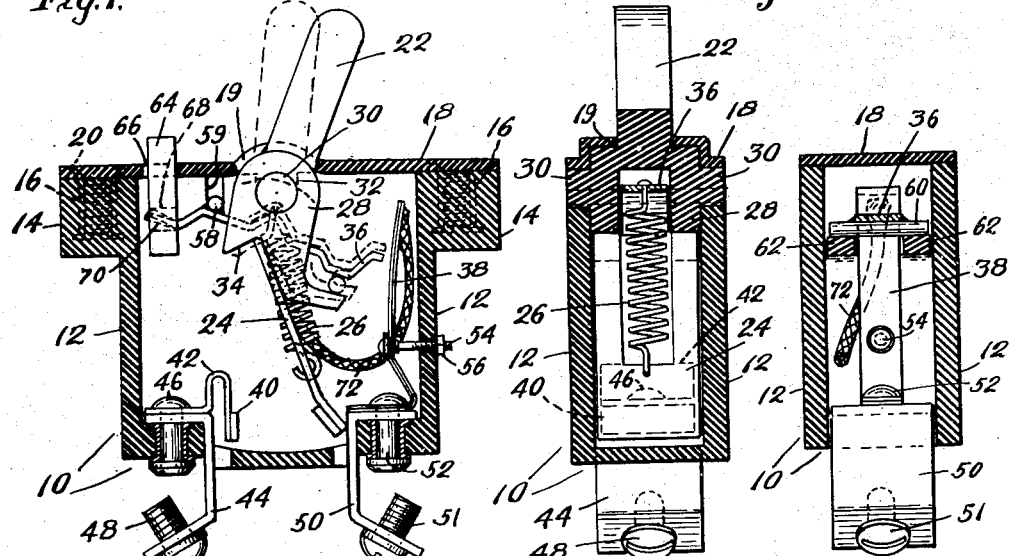
Inventor.
Morris B. Wood Patented Feb. 27, 1945

2,370,340

UNITED STATES PATENT OFFICE 2,370,340

CIRCUIT BREAKER

Morris B. Wood, Newbury, Mass., assignor to The Chase-Shawmut Company, Newburyport, Mass., a corporation of Massachusetts Application July 7, 1942, Serial No. 450,029

16 Claims. (Cl. 200—116)

The present invention relates to circuit breakers and, as illustrated herein, relates more particularly to an improved form of switch or circuit breaker of the type wherein the breaker will open in response to abnormal current conditions but may be maintained in circuit closed position manually even though the abnormal current condition persists.

The use of small circuit breakers is common for controlling the operation of small power circuits to prevent damage thereto because of the occurrence of abnormal current conditions. Such breakers, however, are designed to operate automatically upon the occurrence of an abnormal current condition regardless of the position of the handle for manually operating the device. This is not objectional when the breaker is used to protect house lighting circuits or other small power consuming circuits such as are found in homes and manufacturing establishments. When, however, a circuit breaker is used for controlling the operation of an electrically operated apparatus, as in aircraft and other war vehicles, especially under battle conditions, it is more important to effect the desired operation of the apparatus, which may take but a short time, than it is to protect the apparatus and its circuit against excessive current. Circuits and apparatus can be rendered defective and partially grounded by projectiles to pass excessive current and yet be in condition to be operated for a short time, even when traversed by excessive current. For example, in aircraft, various mechanisms are controlled either directly or indirectly by electric motors as, for instance, retractable landing gear, wing flap mechanism, gun fire mechanism, fuel pumps, and other aircraft accessories. It is apparent that if an abnormal current condition exists, for example, in the circuit of an electric motor which controls the landing gear the operation must be completed in spite of the possibility of injury to the motor or other parts of the circuit. Thus, it is desirable to be able to reclose the overload-opened breaker and to hold it manually in closed position until the operation of the device controlled by the breaker has been completed, after which the breaker can be permitted to open in response to the overload.

Furthermore, small circuit breakers which are designed for use in homes or for protecting small power consuming circuits in manufacturing establishments are not subjected to any substantial vibration or shock and hence need not be biased particularly strongly either into circuit open or circuit closed position. In aircraft and tank installations, however, circuit breakers during normal use are subjected to heavy vibration and some times to heavy shock and it is necessary, therefore, to bias the movable elements of the breaker strongly into either circuit open or circuit closed position or in order that they will not be jarred into or out of circuit closed or circuit open position.

A further requirement of breakers for use in aircraft and other war vehicles is that such breakers must be small in dimensions in order that they will fit into the small space which is available for them. Ordinary breakers are relatively large in dimensions and contain a large number of parts many of which are very delicate and would not be able to withstand the hard usage to which they would be put in aircraft, military gun tanks or other military vehicles.

One object of the present invention, therefore, is to provide a combined circuit breaker wherein the above mentioned difficulties will be overcome. In accordance with this object, one feature of the invention resides in a combined switch and circuit breaker having a movable contact member or switch arm which is movable between circuit open and circuit closed positions with a snap action, an operating handle arranged to be moved manually between said positions, and means connecting the operating handle and the switch arm in such a manner that relative movement as, for instance, a sliding movement, is provided between the movable contact member and its associated stationary contact member while they are engaged and before the movable contact member moves in a circuit opening direction with a snap action. By the use of such a construction the parts are strongly biased into both circuit open and circuit closed position and will not, because of vibration or sudden shock, be accidentally moved from one position to the other. Furthermore, the movement between the movable contact member and the stationary contact member provides a positive breaking apart of the contacts if they should become partially fused or frozen in contact.

The present invention also contemplates the use of current responsive means normally maintained in operative position but biased into an inoperative position upon the occurrence of an abnormal current condition, said current responsive means being arranged to engage the operating handle to move the operating handle toward circuit open position to bias the movable contact arm into circuit open position and cause it to move into said position with a snap action.

The device, furthermore, is so constructed that the circuit through the breaker may be reclosed at any time regardless of whether or not the abnormal current condition persists.

It is desirable, in breakers of the type above referred to, to provide means for indicating the existence of an overload or abnormal current condition. To this end, the present breaker is provided with indicating means which is arranged to be moved into indicating position upon movement of the current responsive means to an inoperative position, thus positively indicating to the operator that the circuit controlled by said breaker has been subjected to an abnormal current.

Another object of the invention is to improve generally upon the construction and operation of combined switches and circuit breakers.

With the above objects and features in view the invention will now be described with reference to the accompanying drawing in which—

Fig. 1 is a view in side elevation of the breaker with the side wall of the enclosing casing removed and showing the parts thereof in circuit closed position;

Fig. 2 is a view similar to Fig. 1 but illustrates the parts in manual circuit open position;

Fig. 3 is a view similar to Fig. 2 but illustrating the parts in circuit open position after operation of the current responsive means;

Fig. 4 is a view in cross section taken along line 4—4 of Fig. 1; and

Fig. 5 is a view in cross section taken along line 5—5 of Fig. 1.

In the accompanying drawing, the combined switch and breaker is illustrated at about twice its actual dimensions. The breaker is thus of small size, which is desirable for use in aircraft, tanks and other vehicles, but it is apparent that the circuit breaker may be made in different sizes if so desired.

The breaker embodying the present invention is illustrated as enclosed in a casing body 10 which is formed of any suitable insulating material, preferably molded in one piece open at the top. The upper portions of the narrow sides 12 of the casing 10 are provided with oppositely outstanding lugs 14 in which eyelets 16 having internal screw threads are secured during molding and which are arranged to receive screws, not shown, which fasten the combined switch and breaker to the panel of the vehicle. The upper end of the casing is open to receive the movable parts of the breaker during assembly thereof but is afterwards closed by a cover 18 having an opening 19, said cover being preferably formed of suitable insulating material. The cover 18 is also provided with beveled openings 20 for receiving the end portions of the eyelets 16 which are upset to secure the cover 18 permanently in position.

The breaker and switch mechanism includes an operating handle 22 formed of suitable insulating material and a movable contact carrying member or arm 24 which is caused to be moved into and out of circuit closed position by an over-center spring 26. The operating handle 22 has a portion which projects substantially outside of the cover 18 and is provided with a lower bifurcated portion 28 which is located within the casing. Opposite the upper end portion of the bifurcated portion 28 are oppositely extending lugs 30 which extend into openings 32 formed in the upper end portions of the side walls of the casing 10 and which act as a pivot for the handle 22. The openings 32 are so located that the side portions of the cover 18 engage the lugs 30 and maintain them in the openings. The bifurcated portions 28 are provided with V-shaped notches 34 which receive the upper ends of the legs of the contact carrying arm 24.

The over-center spring 26 is positioned between the legs and has its lower end fixed thereto. The over-center spring 26 is tensioned and its upper end is fixed to a pivoted trip arm 36 preferably at a point which is approximately coincident with the axis of rotation of the operating handle 22.

The trip arm 36 is located between the upper ends of the bifurcations 28 and is normally maintained in the position shown in Figs. 1 and 2 by engagement with the upper end of a current carrying bimetallic strip 38 responsive to excessive current traversing the breaker, which strip is arranged to flex or warp out of supporting position to permit movement of the trip arm, as will later be described.

When the operating handle 22 is moved in a circuit opening direction from the position shown in Fig. 1 to the position shown in Fig. 2, the contact carrying arm 24 will first be moved downwardly in contact with a stationary contact member 40 to the position shown in dotted lines in Fig. 2 until the apexes of the notches 34 pass to the left and beyond the line of action of the spring 26. The contact carrying member or arm 24 will then move into circuit open position with a snap action independently of further movement of the operating handle 22, and its biased fulcrum engagement with the operating handle 22 will cause the latter to continue its movement in the circuit opening direction until it bears against the right hand edge of the opening 19 in the cover 18.

When it is desired to reclose the breaker manually the operating handle 22 will be moved from the position shown in Fig. 2 to the position shown in Fig. 1, and when the apexes of the notches 34 pass beyond and to the right of the line of action of the over-center spring 26 the contact carrying member or arm 24 will move from the position shown in Fig. 2 into the position shown in Fig. 1 with a snap action independently of further movement of the handle 22 in a circuit closing direction.

The stationary contact member 40 is mounted on the end of a bent spring strip 42 the other end of which is secured to a terminal member 44 by means of a rivet 46 which extends through the metal strip 42 and through the upper bent end of the terminal 44 and through the bottom of the casing 10. The lower end of the terminal member 44 is provided with a screw 48 to which one of the wires of the circuit to be controlled is secured. The other side of the casing 10 is provided with a second terminal member 50 having an upper bent portion and which forms a support for the lower end of the bimetallic strip 38. The bimetallic strip 38 and the terminal member 50 are secured to the bottom of the casing by a rivet 52 in the same manner that the terminal member 44 and the contact supporting strip 42 are secured to the other side of the casing.

The bimetallic strip 38, as illustrated herein, acts directly as a support for the free end of the trip arm 36 and is arranged to be adjusted toward and away from the free end of the trip arm 36 in order that the free end of the bimetallic strip 38 may be flexed a lesser or greater distance to release the trip arm 36 upon the occurrence of a lesser or greater overload current. To this end, an adjusting screw 54 is provided with a head portion engaging the inner surface of the bimetallic strip 38 and passing through the right-hand end 12 of the casing 10. A nut 56 is provided on the outer end of screw 54 which permits the bimetallic strip 38 to be drawn toward the side 12 of the casing, the bimetallic strip 38 being normally biased by its inherent resiliency in the opposite direction. Thus, by adjusting screw 54 the relation between the upper free end of the bimetallic strip 38 and the free end of the trip arm 36 can be adjusted accurately in accordance with the characteristics desired.

Preferably the end 38 of the trip arm that engages the end of the thermostatic strip is given a few degrees of rake, or the strip-engaging surface is inclined downwardly toward the right, Fig. 1, to oppose the disengaging movement of the thermostatic strip to a degree sufficient to hold the parts against unintentional disengagement under vibration when the strip is not warped by excess current.

The trip arm 36, which together with the bimetallic strip 38 controls the automatic operation of the breaker, is provided with a pivot pin 58 which may be formed as a part of the trip arm or may be a separate member secured thereto in any suitable manner and pivoted in the side walls of the casing 10 in slots 59 open at the top of the side walls. Adjacent to the free end of the trip arm 36 is provided a trip pin 60 which is secured to the trip arm 36 in any suitable manner and which is arranged to engage extensions 62 formed as a part of the bifurcated portions 28 of the handle 22. Thus, when the breaker is subjected to a predetermined overload current the bimetallic strip 38 will be flexed by reason of its internal heating and consequent expansion due to the current traversing it toward the right as shown in Fig. 3 and will release the trip arm 36 which will be urged downwardly under the influence of the over-center spring 26. The pin 60 engages the extension 62 and causes the operating handle to move from the circuit closed position shown in Fig. 1 to the position shown in dotted lines in Fig. 3. This carries the apexes of the notches 34 to the left of the line of action of the over-center spring 26 and hence causes the contact carrying member or arm 24 to be moved into circuit open position under the tension of the over-center spring 26 with a snap action. The operating handle 22, of course, continues its movement in a circuit opening direction to the full line position as shown in Fig. 3.

When it is desired to reset the breaker, the operating handle is moved from the position shown in Fig. 3 to the position shown in Fig. 1. The extensions 62 will engage the pin 60 and movement of the handle in the circuit closing direction will move the trip arm 36 from the full line position shown in Fig. 3 to the position shown in Fig. 1. During this movement of the switch arm, the apexes of the notches 34 will pass beyond and to the right of the line of action of the over-center spring 26 and the contact carrying arm 24 will then be moved into circuit closed position with a snap action.

If the bimetallic strip 38 is still flexed as shown in Fig. 3, the contact carrying member or arm 24 can be held in circuit closed position so long as the operating handle 22 is manually held in its circuit closed position. On the other hand, if the bimetallic strip has returned to its normal position, such as shown in Fig. 1, the trip arm 36 will be supported against the bias of the over-center spring 26 and the contact carrying member or arm 24 will remain in circuit closed position by the action of the over-center spring.

With the above construction, it is apparent that the breaker can be reclosed and held in reclosed position even though the overload or abnormal current condition persists and will remain closed as long as the operating handle 22 is held in circuit closed position. This permits the circuit of the motor or other device controlled by the breaker to be reclosed and to be held in such closed position until the motor or other device has completed its operation. This is particularly important in aircraft where the operation of devices essential to the operation of the aircraft must be completed regardless of whether or not injury to the circuit or the devices takes place.

In order to determine visually whether or not the breaker has tripped automatically, there is provided an indicating member 64 which is arranged for sliding movement through an opening 66 formed adjacent to the left hand end of the cover 18. The indicator 64 is provided adjacent to its lower end portion with an opening 68 which receives an end portion 70 of the trip arm 36. As shown in Fig. 1 of the drawing, the indicating member 64 has its upper end projecting slightly above the top surface of the cover 18 and in its normal position held by the bimetallic strip 38. When the trip arm 36, however, moves to the position shown in Fig. 3, because of the occurrence of an overload current, the indicator 64 will be moved into the position shown in Fig. 3 and the upper end thereof will project substantially above the top surface of the cover 18 thus indicating that the trip arm 36 has been freed from the bimetallic strip 38 because of the occurrence of an overload current. Thus, the operator of the aircraft is made aware of the existence of some abnormal current condition and he may, if he so desires and if it is essential to the operation of the aircraft, reclose the breaker to permit the operation of the device controlled by the breaker to continue until that essential operation is completed. Upon landing the aircraft, the position of the indicator 64 will call attention to the fact that there is some defect in the circuit controlled by the breaker and that this condition must be corrected before the aircraft is again used. Thus, the indicator 64 acts not only to inform the pilot or operator of the aircraft that an overload condition exists in the circuit controlled by the breaker but also serves as a means for indicating to the repair crew of the aircraft that such a condition exists and must be corrected.

The electrical connection between the contact carrying arm or member 24 and the bimetallic strip 38 includes a flexible lead or pigtail 72 which is secured at one end to the lower end of the contact carrying arm and at its other end adjacent to the upper end of the bimetallic strip 38 by brazing or other suitable means. Thus, the circuit through the device passes from the terminal member 44, through the resilient or spring strip 42, through the stationary contact 40, through the movable contact carrying arm or member 24, through the flexible lead or pigtail 72, and thence through the bimetallic strip 38 to the terminal member 50.

When the switch is opened by excess current, the spring carries the trip arm 36 in a clockwise direction in engagement with the manual operating member 22 until said member is stopped in open circuit position by abutting against an end wall of the slot 19 in the cover plate, at which time the spring 26 still has abundant tension to hold the contact carrying member or arm 24 against the terminal 50 to which it is connected, so that there is no possibility of the switch jamming closed by vibration.

A heavy excess current traversing the flexible loop 72 acts to separate its legs thereby tending to flex the bimetal member 38 in a tripping direction and also to hasten the movement of the switch member 24 across the line of spring action and, further, to act on the circuit interrupting arc between the contacts tending to extinguish the arc. The magnetic effect of the inverted U-shaped resilient contact carrier 42 also sets up an arc-extinguishing magnetic effect.

Having thus described my invention what I claim as new and desire to secure by Letters Patent of the United States is:

1. In a combined switch and circuit breaker, a manually operated member movable between circuit open and circuit closed positions, a contact controlling member fulcrumed on said manually operated member, a trip arm, current responsive means normally maintaining said trip arm in position, and a resilient member connected at one end to said contact controlling member and at its other end to said trip arm for biasing said contact controlling member into circuit open and circuit closed positions in response to corresponding movements of the manually operated member, said resilient member being also positioned and arranged to bias said trip arm into engagement with said manually operated member upon the occurrence of a predetermined overload condition to move said manually operated member into circuit open position.

2. In a combined switch and circuit breaker, a manually operated member movable between circuit open and circuit closed positions, a fixed pivot for said manually operated member, a contact carrier fulcrumed on the manually operated member and movable to swing its contact between circuit open and circuit closed positions, resilient means for biasing said contact carrier into said circuit open and circuit closed positions in response to corresponding movements of the manually operated member, and means biased by said resilient means normally maintained in a fixed position but releasable to move said manually operated member automatically to circuit open position.

3. In a combined switch and circuit breaker, an operating handle movable between circuit closed and circuit open positions, a fixed pivot for said handle, a contact carrier fulcrumed on the lower end portion of said handle, an over-center spring for biasing said contact carrier into said circuit open and circuit closed positions in response to corresponding movements of the operating handle, a trip member normally maintained in inoperative position but biased by said over-center spring for movement to an operative position, current responsive means normally supporting said trip member against said bias but movable upon the occurrence of a predetermined overload current to release said trip member, and means on said trip member engageable with said operating handle to move said handle into circuit open position upon release of said trip member.

4. In a combined switch and circuit breaker, an operating handle, a contact carrier fulcrumed on the handle and arranged to be operated between circuit open and circuit closed positions and biased to each of said positions when operated thereto, a controlling member biased for movement to an inoperative position, a tension spring connecting said contact carrier and said controlling member, and current responsive means for supporting said controlling member against its bias but movable upon the occurrence of a predetermined overload current to release said controlling member for movement to said inoperative position, said controlling member having means thereon for engaging and moving said operating handle to circuit open position when said controlling means moves to said inoperative posiiton.

5. In a combined switch and circuit breaker, an operating handle movable between circuit open and circuit closed positions, a fixed pivot for said handle, a contact carrier fulcrumed on the lower end of said handle, a pivoted trip member, a tension spring connected at one end to said trip arm and at its other end to said contact carrier, said spring being effective to bias said contact carrier into circuit open and circuit closed positions when operated thereto, a current responsive member for maintaining said trip member in position against the bias of said spring and movable upon the occurrence of a predetermined overload current to release said trip member, and means on said trip member engaging said operating handle for moving said handle to circuit open position when said trip member is moved under the bias of said spring.

6. In a combined switch and circuit breaker, an operating handle movable between circuit open and circuit closed positions, a fixed pivot for said handle, a contact carrier fulcrumed on the lower end of said handle, a trip member normally maintained in an operative position, an over-center spring fixed at one end to said contact carrier and at its other end to said trip member, a current carrying bimetal member normally supporting said trip member in operative position against the bias of said spring, said bimetal member being arranged to be flexed out of supporting position upon becoming heated to a predetermined temperature by a predetermined overload current, and a projection on said trip member arranged to engage and move said operating handle to circuit open position when said trip member is moved under the bias of said spring, thereby moving the pivot of said contact carrier across dead center position and causing the contact carrier to move into circuit open position with a snap action.

7. Switch operating mechanism including a fulcrumed lever swingable in opposite directions, abutments limiting the movement of said lever in opposite directions, a spring acting on said lever to hold it against one abutment when said lever is in one position and against the other abutment when said lever is in the opposite position, a fulcrum for said lever, and means for moving said fulcrum across the line of action of said spring to move said lever away from an abutment with snap action, said last named means including an element biased by said spring for moving said fulcrum, there being electro-responsive means normally holding said element against the bias of said spring.

8. In an electric switch, a fulcrumed switch member movable into positions corresponding to circuit closed and circuit open conditions of the switch, a fulcrumed operating member providing a movable fulcrum for said switch member and movable manually into positions corresponding to circuit closed and circuit open conditions of the switch, an over-center spring having a connection with said switch member and a line of action traversed by said movable fulcrum and when traversed by said fulcrum to move said switch member with snap action into and out of circuit closed position an element biased by said spring for moving said fulcrum, and electro-responsive means normally holding said element against the bias of said spring and operable to release said element to effect automatic opening movement of said switch member, said over-center spring biasing said switch member and said operating member in opposite directions about their respective fulcrums in both their circuit closed and circuit open positions.

9. In an electric switch, a fulcrumed manual operating handle movable in opposite directions between positions corresponding to open circuit and closed circuit conditions of the switch, a pivoted lever engageable with a part of said handle for moving the handle from a closed circuit to an open circuit position, spring means acting on said lever for effecting such movement, electro-responsive means normally holding said lever against the action of said spring, and a switch member operated by said handle between circuit open and circuit closed positions, said switch member having an interconnection with said spring and being positioned and arranged to effect movement of said switch member out of circuit closed position with snap action in response both to manual and spring movements of said handle.

10. In an electric switch, a fulcrumed manual operating handle movable in opposite directions between positions corresponding to open circuit and closed circuit conditions of the switch, a pivoted lever engageable with a part of said handle for moving it from a closed circuit to an open circuit position, spring means acting on said lever for effecting such movement, electro-responsive means normally holding said lever against the action of said spring and automatically operable to release the lever, and a switch member operated by said handle between circuit open and circuit closed positions, said switch member having an interconnection with said spring whereby the spring effects movement of said switch member out of circuit closed position with snap action in response both to manual movement of said handle and automatic release of said lever, said handle having means holding said lever in an unoperated position when the handle is held manually in circuit closed position notwithstanding operation of said electro-responsive means.

11. In a combined switch and circuit breaker, an operating handle movable between circuit open and circuit closed positions, a fixed pivot for said handle, a contact carrier fulcrumed on the lower end of said handle, a trip member normally maintained in an operative position, an over-center spring fixed at one end to said contact carrier and at its other end to said trip member, a current carrying bimetal member normally supporting said trip member in operative position against the bias of said spring and extending in general parallelism with said contact carrier, said bimetal member being arranged to be flexed out of supporting position upon becoming heated to a predetermined temperature by a predetermined overload current, and a flexible conductor of generally U-shape having the end of one arm of the U connected to the bimetal member in a relation such that the magnetic movement incident to the U-shape of the conductor acts on said one arm in the direction of said flexing of the bimetal member and also acts in direction tending to extinguish an arc drawn by opening movement of said contact carrier, said U-shaped conductor being in such proximity to the contact of said contact carrier that said magnetic movement is in position to have said arc-extinguishing tendency.

12. In an electric switch, terminals, a resilient inverted loop conductor having one leg connected to a terminal, a contact member carried by its other leg, a fulcrumed current carrying switch member carrying at one end a contact member cooperating with said first named contact member and extended generally parallel with said other leg, conducting means connecting the other end of said switch member with another terminal, and means for reciprocating said switch member to engage and separate said contact members with snap action.

13. In an electric switch, a fulcrumed switch member, a spring for moving the switch member only when the fulcrum of said switch member moves across the line of action of said spring and for urging said fulcrum across the line of spring action, and electro-responsive means for controlling the last named action of said spring.

14. In an electric switch, a manually-operated member, a switch arm pivotally supported by said member, a stationary contact cooperating with said arm in the switch-closed position thereof, an over-center spring acting on said arm selectively on opposite sides of the pivot to hold said arm selectively in switch-closed and switch-open positions, an element movable into engagement with said manually operated member and biased by said spring toward such engagement, and electro-responsive means normally restraining the said element and operative to cause said spring to shift the position of said manually operated member to effect an operation of the switch.

15. A combined switch and circuit breaker comprising a pivoted operating lever of which one arm constitutes a handle on one side of the pivot and the other arm provides a fulcrum on the opposite side of the pivot, a contact-carrying member fulcrumed at one end on said fulcrum and having its contact at the opposite end, a pivoted trip arm having its pivot toward one end thereof and having extent in direction generally transverse of the axis of said pivoted lever, thermally responsive means supporting the trip arm at its end remote from the pivot and operative under abnormal circuit conditions to move out of supporting position, a spring connected at one end to the contact carrying end of the contact-carrying member and at its other end to said trip arm biasing said member about its pivot and said arm about its fulcrum in opposite directions, and also biasing said trip arm out of its supported position, said operating lever being movable about its pivot between circuit-open and circuit closed positions thereof to move said fulcrum across the line of action of the spring and cause snap movement of the contact-carrying member between circuit-open and circuit-closed positions thereof, and said trip arm, when unsupported by the thermally responsive means being movable to a tripped position by the spring to move said fulcrum across the line of action of the spring.

16. A combined switch and circuit breaker comprising a pivoted operating lever having a handle on one side of its pivot and a bifurcated portion extending on the other side of its pivot, a pivoted trip arm extending in the bifurcated part of said lever, thermally responsive means supporting the trip arm at its end remote from its pivot, a contact carrier fulcrumed on the bifurcated part of said lever, a spring connected at one end to the contact carrier and at its other end to the trip arm and biasing the trip arm out of its supported position and biasing the contact carrier and lever in opposite rotative directions, said operating lever being movable manually to shift the fulcrum of the contact carrier across the line of action of the spring, and said trip arm having means for engaging the operating lever and, when released by the thermally responsive means, being automatically movable to shift the fulcrum of the contact carrier across the line of action of the spring.

MORRIS B. WOOD.